Sept. 13, 1932.  H. F. ATKINS  1,877,637
MACHINE FOR DRESSING REVOLVING GRINDING WHEELS
Filed May 13, 1932  2 Sheets-Sheet 1
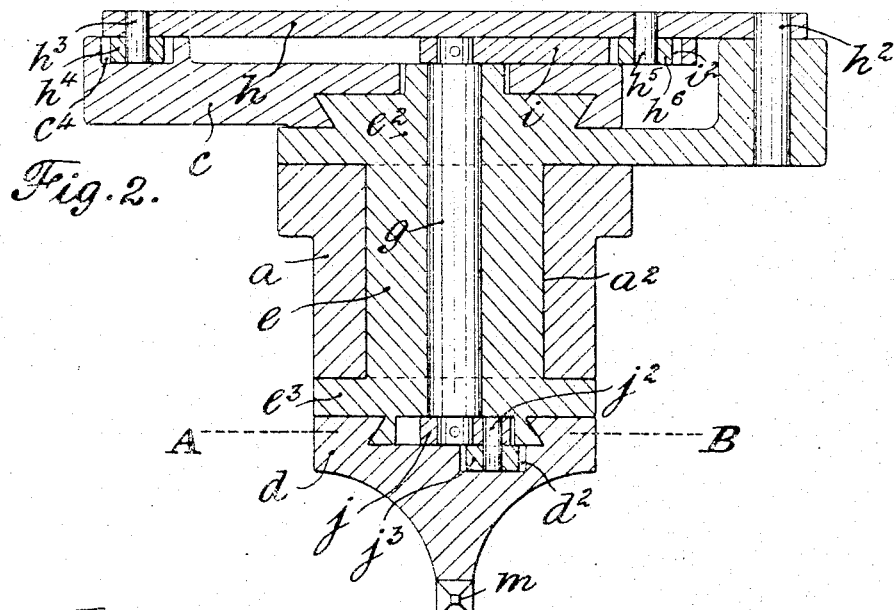
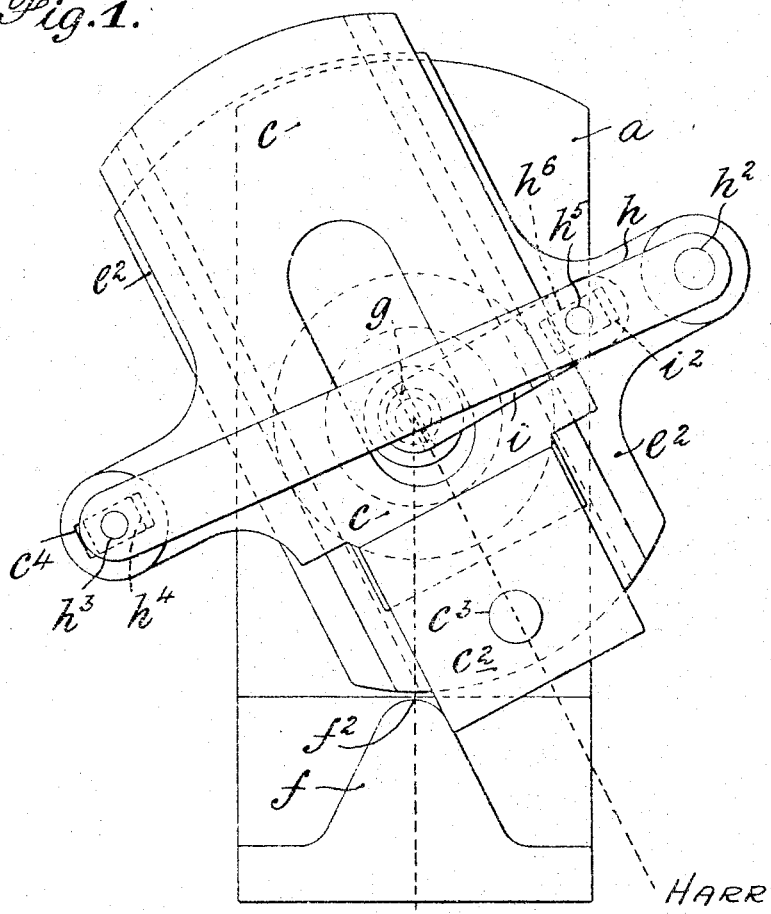
INVENTOR
HARRY F. ATKINS
BY
Oscar A. Geier
ATTORNEY

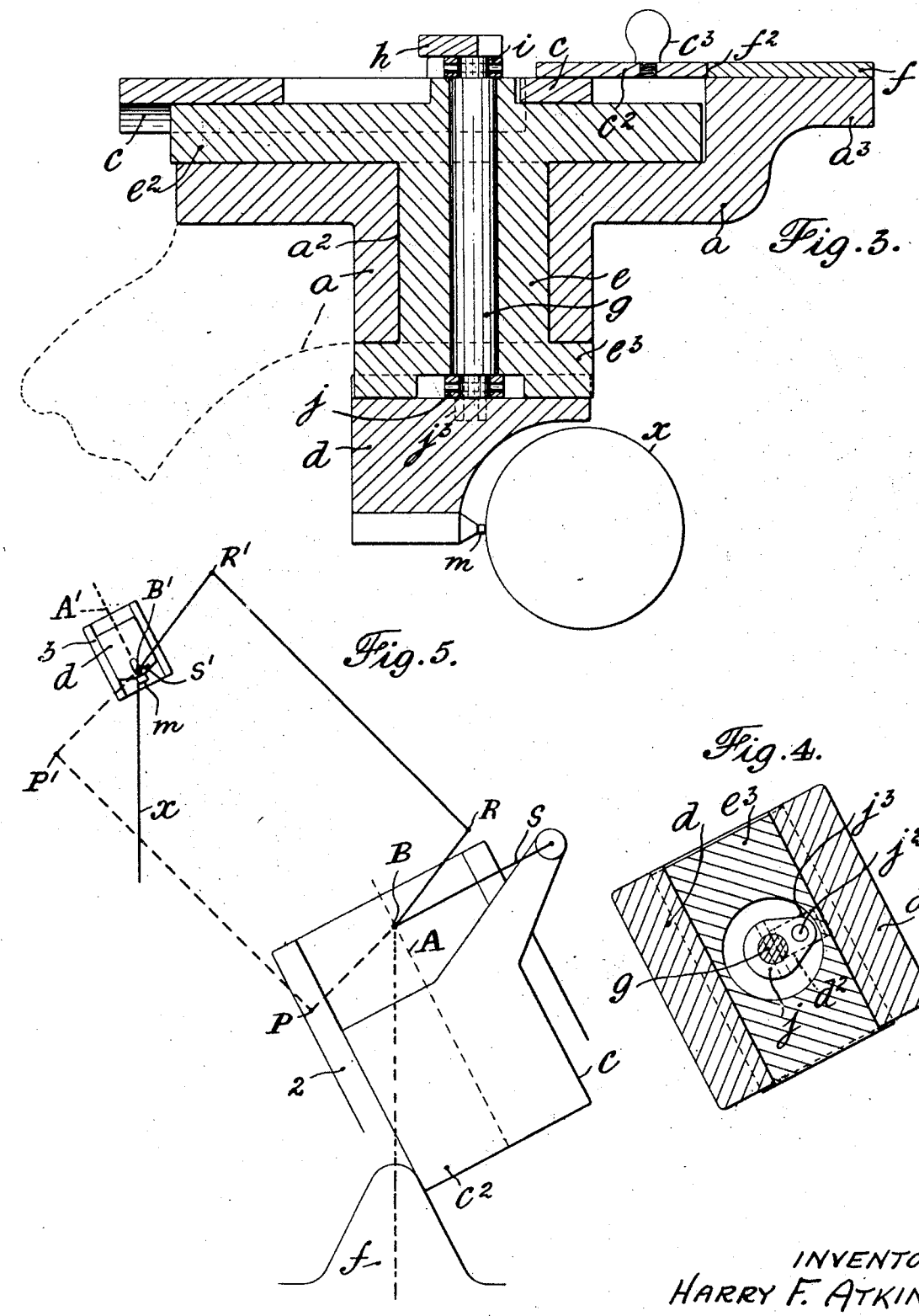

Patented Sept. 13, 1932

1,877,637

UNITED STATES PATENT OFFICE

HARRY FREDERICK ATKINS, OF PETERBOROUGH, ENGLAND

MACHINE FOR DRESSING REVOLVING GRINDING WHEELS

Application filed May 13, 1932, Serial No. 611,085, and in Great Britain May 21, 1931.

The invention relates to a machine for dressing a revolving grinding wheel of the kind using a former and a diamond or like dresser, and comprises a combination of parts embodying two pivoted slides one slide carrying the dressing tool and the other slide a stylus, means for causing the said two slides to move in unison through an equal angle, and means for causing the said two slides to move to and from their pivot, or pivots, by an equal or proportionate linear amount of movement. One combination embodies a construction in which the two pivoted slides have a common pivot, while another combination combines link and lever and shaft gearing for coupling the two slides for linear movement, the shaft being arranged on the pivot axis.

The combinations hereinbefore stated and hereinafter clearly stated in the claims are represented in a machine illustrated by the accompanying drawings upon which

Fig. 1 is a plan,

Fig. 2 a transverse section of Fig. 1,

Fig. 3 a side section of Fig. 1, but with the slides in a different position,

Fig. 4 a transverse section of Fig. 2, on the dotted lines A—B, but at the same angle as Fig. 1, and Fig. 5 a diagram where the pivots of the respective slides are separate pivots.

With reference to Figs. 1 to 4, $a$ is the stationary frame of the machine providing the pivot centre for the two slides $c$ and $d$, the first of which is the stylus slide and the other the dresser slide. The frame $a$ provides at $a2$ a vertical sleeve for the reception of a revoluble middle member, $e$, having upper and lower saddles $e2$, $e3$ upon which both slides $c$ and $d$ are mounted to revolve always with the saddles, but to have linear movement thereon independently of the saddles, but proportionately to each other as will be hereinafter described. A former $f$ is rigidly supported upon an extension $a3$ of the frame, and a stylus $c2$, which is a part of the upper slide and which is moved by hand from the knob $c3$, contacts the face of the former, as shown by Figs. 1 and 3, and governs the linear and angular movements of this slide $c$ upon the upper saddle and about the pivot centre. It will be therefore clear that if the stylus slide $c$ makes an angular movement about the pivot centre of the saddle the dresser slide $d$ makes an equal angular movement. A shaft $g$ passes freely through the saddle on the axis of pivoting of the two slides $c$ and $d$ to said saddle, and this shaft connects the said two slides $c$ and $d$ for proportionate linear movement, and by the following devices. One end of a rigidly built lever $h$ is fulcrumed to the saddle at $h2$, and at its other end is pivot jointed to the stylus slide $c$ by a pivoting pin $h3$ and block $h4$, the latter working in an elongated recess $c4$ of said stylus slide. A distance from the fulcrum $h2$ of the lever $h$ said lever is coupled, by a pivoting pin $h5$ and a pivoting block $h6$, to the free end of an arm $i$ lying in a plane parallel with the lever $h$ and fixed at its inner end to the shaft $g$, the block $h6$ working in an elongated slot $i2$ of the arm, so that a linear movement of the stylus slide $c$ causes a part revolution of the shaft $g$. The dresser slide $d$ is connected with the lower end of the shaft $g$ by a short radial arm, $j$, carrying a pin $j2$ and a block $j3$ working in an elongated recess $d2$ of the dresser slide. It therefore follows that if the stylus slide $c$ makes linear movement the dresser slide $d$ makes proportionate linear movement, while only together can both slides through their common saddle $e$, $e2$, $e3$, make equal angular movement about the common axis of pivoting.

The dressing tool is represented as a small diamond $m$ mounted upon the dresser slide $d$. The revolving grinding wheel is indicated at $x$ in Fig. 3, the diamond contacting the crest of the wheel because the stylus $c2$ is contacting the crest $f2$ of the former $f$.

The diagram, Fig. 5, represents a form of the invention in which the two slides c and d have separate pivoting points instead of a common pivoting point, and only the two slides c and d, the diamond m, the stylus c2, the former f and the grinding wheel x have similar letters of reference to Figs. 1 to 4, as the arrangement involves somewhat different parts.

The pivot of the saddle 2 for the slide c is at B, while the pivot for the saddle 3 of the slide d is at B1, and when the stylus c2 moves round its pivot B it causes the said diamond m to move round its pivot B1 through an equal angle by means of the link motion shown in dotted lines, wherein P, P1 are joints and A, B, P and A1, B1, P1 are members fixed to the saddles and pivoted at B and B1 respectively. When the said stylus c2 moves in a straight line with its slide c about the former f, it causes the diamond m to move a proportionate amount on its slide d by means of the link motion shown in full lines, wherein R and R1 are joints, and S, B, R and S1, B1, R1, are rigid bell-crank levers loosely pivoted at B and B1 respectively. Linear movement of the stylus c2 causes the bell crank lever S, B, R to move through an angle, and this angular motion is transmitted to the bell-crank lever S1, B1, R1 to give the diamond slide d a linear motion proportionate to the movement of the stylus. The pivoted saddle 2 and the pivoted saddle 3 are pivoted at B, B1 and are connected by the linkage in which the joints P, P1 are embodied, so that if the pivoted saddle 2 moves angularly about its pivot B, carrying its slide c with it, the pivoted saddle 3 moves the same angle carrying its slide with it.

A centre line passing through the former f intersects with the point of pivoting of the stylus slide, clearly shown by Figs. 1 and 5, and a centre line passing through the grinding wheel x (at right-angles to the axis) is always parallel with the centre line passing through the former and intersects with the point of pivoting of the diamond slide (also shown in Figs. 1 and 5), both points being common in Figs. 1 to 3 and different points in Fig. 5. The distance from the pivot centre of the stylus slide to the end of the stylus is either the same as, or proportionate to, the distance from the pivot centre of the diamond slide to the end of the diamond, dependent upon whether the two slides make an equal linear movement or an unequal linear movement. The diamond shape and size are chosen to suit the grinding wheel to be dressed, and the stylus is made an exact replica, or an exactly enlarged replica, of the diamond.

The machine according to the invention may be constructed as a specific one for grinding a particular grinding wheel, using one size and shape of former only, but said machine might be constructed so that the former and diamond are interchangeable, in which case the shape of the stylus and diamond would be such as to efficiently co-operate with the angle and shape of the former, and this latter provision would apply in case the faces of the grinding wheel and the faces of the former are curved ones where a point, or rounded, contact of the stylus and diamond is advisable.

Having now described my invention, what I claim and desire to secure by Letters Patent is—

1. A machine for dressing a revolving grinding wheel, combining a stationary supporting frame, two pivoted slides mounted upon the frame one slide carrying a dressing tool and the other slide carrying a stylus, means for coupling both slides to move in unison through an equal angle about their pivotings from a movement of one of them, means for coupling both slides for linear movement to and from the points of pivoting from a movement of one of them, and a former mounted upon the frame and with which the stylus is adapted to make governing contact for all movements of the slides, substantially as described.

2. A machine for dressing a revolving grinding wheel, combining a stationary supporting frame, upper and lower saddles mounted upon the frame with a common point of pivoting, a slide carrying a dressing tool mounted upon the one saddle, a slide carrying a stylus mounted upon the other saddle, means for coupling both slides for linear movement to and from the common point of pivoting of the two saddles from a movement of one of them, and a former mounted upon the frame and with which the stylus is adapted to make governing contact for all movements of the slides, substantially as described.

3. A machine for dressing a revolving grinding wheel, combining a stationary supporting frame, upper and lower saddles mounted upon the frame with a common point of pivoting, a slide carrying a dressing tool mounted upon the one saddle, a slide carrying a stylus mounted upon the other saddle, a shaft passing through the two saddles axially to revolve independently thereof, means for coupling the two slides to the shaft so that a linear movement of one forces a linear movement of the other, and a former mounted upon the frame and with which the stylus is adapted to make governing contact for all movements of the slide, substantially as described.

4. A machine for dressing a revolving grinding wheel combining a stationary supporting frame, two pivoted slides mounted upon the frame by different pivoting points, one slide carrying a dressing tool and the other slide carrying a stylus, means for coupling both slides to move in unison through an equal angle about their separate points of pivoting from a movement of one of them, means for coupling both slides for linear movement to and from their separate points of pivoting from a movement of one of them, and a former mounted upon the frame and with which the stylus is adapted to make governing contact for all movements of the slides, substantially as described.

In testimony whereof I have affixed my signature.

HARRY FREDERICK ATKINS.